US008718092B2

(12) United States Patent
Hori et al.

(10) Patent No.: US 8,718,092 B2
(45) Date of Patent: May 6, 2014

(54) COMMUNICATION NETWORK SYSTEM, NETWORK SWITCH AND BANDWIDTH CONTROL, FOR SITE-TO-SITE COMMUNICATIONS

(75) Inventors: Kenji Hori, Saitama (JP); Wataru Uchikawa, Tokyo (JP); Masaya Fujiwara, Tokyo (JP); Yasunobu Ono, Tokyo (JP); Riichiro Asaoka, Tokyo (JP); Akira Idoue, Saitama (JP)

(73) Assignee: KDDI Corporation, Tokyo (JP)

( * ) Notice: Subject to any disclaimer, the term of this patent is extended or adjusted under 35 U.S.C. 154(b) by 595 days.

(21) Appl. No.: 13/035,416

(22) Filed: Feb. 25, 2011

(65) Prior Publication Data

US 2011/0149972 A1      Jun. 23, 2011

Related U.S. Application Data

(63) Continuation-in-part of application No. PCT/JP2009/064877, filed on Aug. 26, 2009.

(30) Foreign Application Priority Data

Aug. 28, 2008    (JP) ................................. 2008-218976

(51) Int. Cl.
*H04J 3/16*          (2006.01)
(52) U.S. Cl.
USPC .......................................... 370/468; 370/231
(58) Field of Classification Search
USPC ............ 370/230, 231, 392, 395.21, 401, 431, 370/468
See application file for complete search history.

(56) References Cited

U.S. PATENT DOCUMENTS 6,950,435 B2    9/2005  Kitamura
8,451,722 B2 *  5/2013  Isobe et al. .................... 370/230

(Continued)

FOREIGN PATENT DOCUMENTS

JP    A 2002-232461    8/2002
JP    A 2002-247092    8/2002

(Continued)

OTHER PUBLICATIONS

International Search Report issued in PCT/JP2009/064877, mailed Oct. 20, 2009. (with English-language translation).

*Primary Examiner* — Hassan Phillips
*Assistant Examiner* — Ajay Cattungal
(74) *Attorney, Agent, or Firm* — Oliff PLC

(57) ABSTRACT

A communication network system is disclosed in which local-branch-site-line network switches accommodating local-branch-site lines, and at least one data-center-site-line network switch accommodating at least one data-center-site line, are interconnected via a carrier network. This system include: a first bandwidth controller, disposed at each local-branch-site-line network switch, configured to limit a bandwidth of each of inbound packets and/or outbound packets to a pre-selected bandwidth α, wherein the inbound packets flow from the instant local-branch-site-line network switch or other local-branch-site-line network switches, and the outbound packets flow to the instant local-branch-site-line network switch or other local-branch-site-line network switches; and a second bandwidth controller, disposed at each local-branch-site-line network switch, configured to limit a bandwidth of each of inbound packets and/or outbound packets to a pre-selected bandwidth β broader than the bandwidth α, wherein the inbound packets flow from the data-center-site-line network switch, and the outbound packets flow to the data-center-site-line network switch.

15 Claims, 12 Drawing Sheets

(56) References Cited

U.S. PATENT DOCUMENTS

| | | |
|---|---|---|
| 2002/0114337 A1* | 8/2002 | Kitamura ................ 370/401 |
| 2004/0184803 A1* | 9/2004 | Chang et al. ............ 398/58 |
| 2006/0176808 A1 | 8/2006 | Isobe et al. |
| 2008/0247402 A1* | 10/2008 | Sasaki et al. ............ 370/401 |
| 2009/0245497 A1* | 10/2009 | Ruetschi et al. ......... 379/202.01 |
| 2009/0304018 A1* | 12/2009 | Torger et al. ............ 370/431 |

FOREIGN PATENT DOCUMENTS

| | | |
|---|---|---|
| JP | A 2004-529546 | 9/2004 |
| JP | A 2006-222592 | 8/2006 |
| JP | A 2008-104107 | 5/2008 |
| WO | WO 02/076050 A1 | 9/2002 |

\* cited by examiner

FORWARDING DATABACE

| DESTINATION ADDRESS OF USER'S PACKET | NETWORK-SWITCH IDENTIFIER | OUTPUT I/F |
|---|---|---|
| AAA | $\alpha$ | 1/1 |
| BBB | $\alpha$ | 1/1 |
| CCC | $\beta$ | 1/1 |
| DDD | $\beta$ | 1/1 |
| EEE | $\gamma$ | 1/2 |
| FFF | $\gamma$ | 1/2 |

FIG.12

COMMUNICATION NETWORK SYSTEM, NETWORK SWITCH AND BANDWIDTH CONTROL, FOR SITE-TO-SITE COMMUNICATIONS

CROSS-REFERENCE TO RELATED APPLICATIONS

This application is a continuation-in-part filing of International Patent Application No. PCT/JP2009/064877, filed Aug. 26, 2009 and published Mar. 4, 2010 as WO 2010/024297, which claims the priority benefit of Japanese Serial No. 2008-218976, Aug. 28, 2008, the contents of which applications and publication are incorporated herein by reference in their entirety.

BACKGROUND OF THE INVENTION

1. Field of the Invention

The invention relates generally to a communication network system, a network switch and bandwidth control, for site-to-site communications.

2. Description of the Related Art

Each of many enterprises has a plurality of sites (e.g., a data center site, and local branch sites) which are geographically distributed over a wide area. In such an enterprise, "site-to-site communications" are established between selected ones of the sites, over a shared enterprise-network which is configured by interconnecting a plurality of LANs (Local Area Networks) located on a per-site basis, so as to span a wide geographical area.

Typical types of wide area networking include: a first type in which the sites are mutually communicated by point-to-point leased- or dedicated-line services; and a second type in which the sites are mutually communicated over a multi-point VPN (Virtual Private Network) service network, such as IP (Internet Protocol)-VPN or a Wide Area Ethernet (Registered Trademark) network.

The second type, as compared with the first type, is advantageous in implementing low-cost and high-speed site-to-site communications, resulting in the growing shift to site-to-site communications using a VPN service network.

Currently, many enterprises, aiming at centralized management of information asset, and compliance such as internal control and personal information protection, are promoting centralization to a date center, of resources such as servers or storages (hereinafter, referred to as "resource centralization"). The resource centralization reduces the burden of managing operation of systems such as servers and storages, and saves the required costs through the resulting system hardware integration.

FIGS. 1A and 1B illustrate the configuration of a conventional site-to-site communications system.

As illustrated in FIG. 1B, a plurality of private networks such as LANs are located at a plurality of sites are linked. These private networks are linked through respective routers and respective communication lines, with respective network switches 1. These network switches 1 participate in a shared network in the form of a carrier network 2 (i.e., a network administered by a telecommunication company) represented by a VPN service network. In an example, these sites include a data center site at which a data center is located, and a plurality of local branch sites. As illustrated in FIG. 1A, the local branch sites are geographically distributed, and utilize shared resources such as servers or storages located at the data center.

Such conventional networking is disclosed in, for example, Japanese Patent Application Publication Nos. 2002-232461 and 2004-529546, the contents of which are incorporated herein by reference in their entirety.

BRIEF SUMMARY OF THE INVENTION

In an enterprise communication system, it is desirable that a time to respond during the process of accessing a server or a storage does not exceed an allowable maximum time. To satisfy this demand while achieving the resource centralization as described above, there is a need for assigning a broader communication bandwidth to communications between the data center site and each local branch site. There is an additional need for ensuring successful communications between the local branch sites, in addition to successful communications between the data center site and the local branch sites.

For utilizing a conventional VPN service network, however, it is required that all the local branch sites be assigned a broadened common bandwidth (e.g., a customer's contracted bandwidth), resulting from a drawback relating to identification of the individual final destinations of user traffic in a communication system.

More specifically, firstly, the conventional VPN service network has a drawback that bandwidth control cannot be performed depending on the identified individual final destinations of user traffic. Still more specifically, the bandwidth control cannot be performed in a varying mode depending on whether the final destination of user traffic originating from one of the local branch sites, is another local branch site or the data center site.

Secondly, a carrier (i.e., a telecommunication company) is required to guarantee any user to use a minimum bandwidth, whatever the final destination of the user traffic is. To this end, there is a need for designing and constructing relay transmission paths within a VPN service network, so as to meet the requirements on the bandwidths for site-to-site communications. The cost that the carrier spends for constructing the relay transmission paths can be recovered by a communication cost (i.e., a telephone-line cost) that potential users or customers pay. Generally, the communication cost is calculated depending on how many sites participate in the carrier network, and how broad the user-assigned bandwidths are relative to the total capacity of the VPN service network.

For these reasons, for utilizing such a convention VPN service network, when a user, because of promotion of the resource centralization to the data center, thinks it necessary to broaden only a bandwidth for communications between the data center site and each local branch site, the user, nevertheless, has to pay a high communication cost relative to the user's need.

In view of the foregoing, it would be desirable for a communication network system in which a plurality of local-branch-site-line network switches accommodating a plurality of local-branch-site lines, respectively, and at least one data-center-site-line network switch accommodating at least one data-center-site line, are interconnected via a carrier network, to allow a bandwidth for communications with the data center site, and a bandwidth for communications with other sites, to be assigned separately.

According to a first aspect of the invention, a communication network system is provided in which a plurality of local-branch-site-line network switches accommodating a plurality of local-branch-site lines, respectively, and at least one data-center-site-line network switch accommodating at least one data-center-site line, are interconnected via a carrier network.

This communication network system includes:

a first bandwidth controller, disposed at each local-branch-site-line network switch, configured to limit a transmission bandwidth of each of inbound packets and/or outbound packets to a pre-selected local-branch-site-line bandwidth $\alpha$, wherein the inbound packets flow from the instant local-branch-site-line network switch or other local-branch-site-line network switches, and the outbound packets flow to the instant local-branch-site-line network switch or other local-branch-site-line network switches;

a second bandwidth controller, disposed at each local-branch-site-line network switch, configured to limit a transmission bandwidth of each of inbound packets and/or outbound packets to a pre-selected data-center-site-line bandwidth $\beta$ broader than the local-branch-site-line bandwidth $\alpha$, wherein the inbound packets flow from the data-center-site-line network switch, and the outbound packets flow to the data-center-site-line network switch; and a third bandwidth controller, disposed at the data-center-site-line network switch, configured to limit a transmission bandwidth of each of inbound packets and/or outbound packets to a pre-selected data-center-site-line bandwidth $\gamma$, wherein the inbound packets flow from the plurality of local-branch-site-line network switches, and the outbound packets flow to the plurality of local-branch-site-line network switches.

According to a second aspect of the invention, a bandwidth control method is provided which is implemented in a communication network system in which a plurality of local-branch-site-line network switches accommodating a plurality of local-branch-site lines, respectively, and at least one data-center-site-line network switch accommodating a data-center-site line, are interconnected via a carrier network.

This bandwidth control method includes:

causing each local-branch-site-line network switch to limit a communication bandwidth, such that a bandwidth for communications between the instant local-branch-site-line network switch and other local-branch-site-line network switches, becomes a pre-selected local-branch-site-line bandwidth $\alpha$, while a bandwidth for communications between the instant local-branch-site-line network switch and the data-center-site-line network switch, becomes to a pre-selected data-center-site-line bandwidth $\beta$ broader than the local-branch-site-line bandwidth $\alpha$; and causing the data-center-site-line network switch to limit a bandwidth for communications between the instant data-center-site-line network switch and the plurality of local-branch-site-line network switches, to a pre-selected data-center-site-line bandwidth $\gamma$.

It is noted here that, as used in this specification, the singular form "a," "an," and "the" include plural reference unless the context clearly dictates otherwise. It is also noted that the terms "comprising," "including," and "having" can be used interchangeably.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 12 illustrates a forwarding database in table format, which is used in each local-branch-site-line network switch in the communication network system according to the first illustrative embodiment of the invention.

DETAILED DESCRIPTION OF THE INVENTION

Figure 1A:
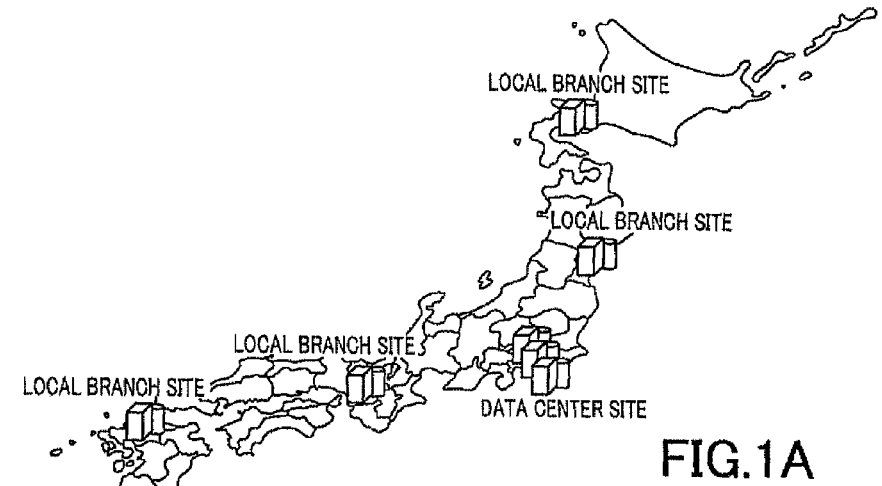
FIG. 1 is a view illustrating the configuration of a conventional site-to-site communications system.
Figure 1B:
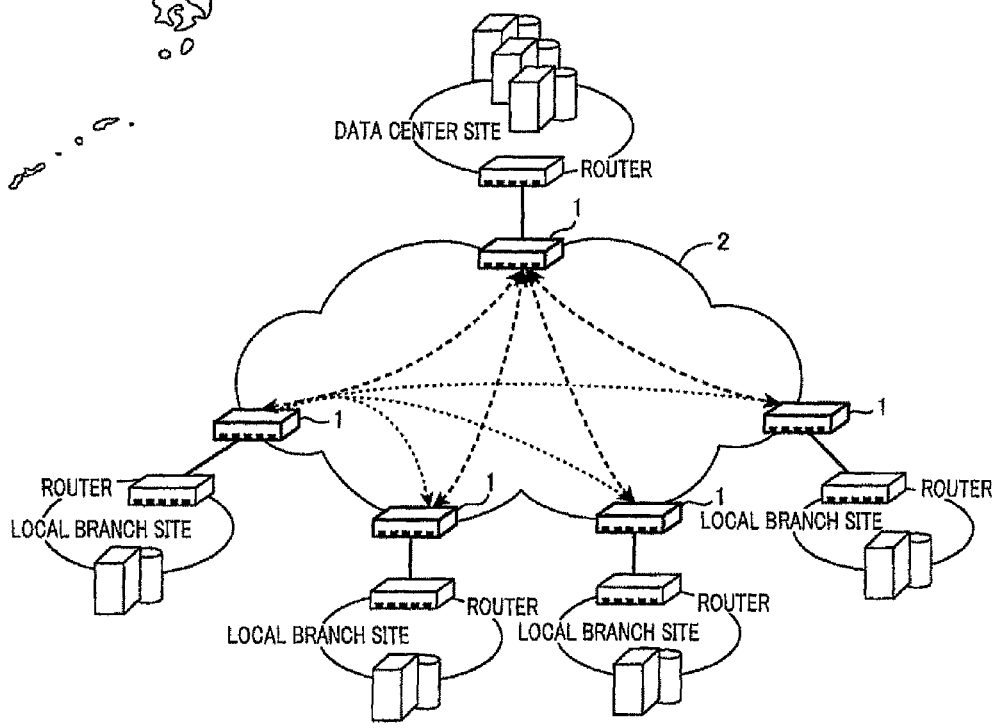

According to the invention, the following modes are provided as illustrative embodiments of the invention.

According to a first mode of the invention, there is provided the communication network system according to the first aspect, wherein each local-branch-site-line network switch further comprises a destination-node identifying section configured to transfer to the first or second bandwidth controller, packets forwarded from a corresponding one of the plurality of local-branch-site lines, such that selected ones of the packets, each of which is destined for the instant local-branch-siteline network switch or other local-branch-site-line network switches, are transferred to the first bandwidth controller, while selected ones of the received packets, each of which is destined for the data-center-site-line network switch, are transferred to the second bandwidth controller, the data-center-site-line network switch is configured to allow the third bandwidth controller to operate for packets which are forwarded to the carrier network, and for packets which are forwarded from the carrier network, and each local-branch-site-line network switch further comprises a source-node identifying section configured to transfer to the first or second bandwidth controller, packets forwarded from the carrier network, such that, selected ones of the packets, each of which is sourced from the instant local-branch-site-line network switch or other local-branch-site-line network switches, are transferred to the first bandwidth controller, while selected ones of the packets, each of which is sourced from the data-center-site-line network switch, are transferred to the second bandwidth controller.

According to a second mode of the invention, there is provided the communication network system according to the first mode, wherein each local-branch-site-line network switch further comprises a data-center-site-line-address storage for storing a data-center-site-line address which corresponds to a device or a network connected to the data-center-site-line network switch via the data-center-site line, the destination-node identifying section of each local-branch-site-line network switch is configured to transfer packets to the first or second bandwidth controller, such that packets each having a destination address which does not match the data-center-site-line address, are transferred to the first bandwidth controller, while packets each having a destination address which matches the data-center-site-line address, are transferred to the second bandwidth controller, and the source-node identifying section of each local-branch-site-line network switch is configured to transfer packets to the first or second bandwidth controller, such that packets each having a source address which does not match the data-center-site-line address, are transferred to the first bandwidth controller, while packets each having a source address which matches the data-center-site-line address are transferred to the second bandwidth controller.

According to a third mode of the invention, there is provided the communication network system according to the first mode, wherein each local-branch-site-line network switch further comprises a data-center-site-line-address storage storing a data-center-site-line address corresponding to a device or a network connected to the data-center-site-line network switch via the data-center-site line, the destination-node identifying section of each local-branch-site-line network switch is configured to transfer packets to the first or second bandwidth controller, such that packets each having a destination address which does not match the data-center-site-line address, are transferred to the first bandwidth controller, while packets each having a destination address which matches the data-center-site-line address, are transferred to the second bandwidth controller, the data-center-site-line network switch further comprises a flag setter configured to allow the third bandwidth controller to operate for packets which is to be forwarded to the carrier network, and to set a flag for or add the flag to each of the packets, and each local-branch-site-line network switch further comprises, instead of the source-node identifying section, a flag checker configured to transfer to the first or second bandwidth controller, packets forwarded from the carrier network, such that, selected ones of the packets, each of which is not flagged, are transferred to the first bandwidth controller, while selected ones of the packets, each of which is flagged, are transferred to the second bandwidth controller, the flag checker further configured to reset the flag of or remove the flag from each packet which is to be transferred to the second bandwidth controller, before transfer to the second bandwidth controller.

According to a fourth mode of the invention, there is provided the communication network system according to the second or third mode, wherein each local-branch-site-line network switch further comprises:

a forwarding database having stored therein a correspondence between a plurality of network-switch identifiers of network switches and a plurality of line addresses corresponding to a device or a network connected to the network switches via corresponding respective lines; and a data-center-site-line-address setting section configured to operate, after and in accordance with user entry into an operator console, of a data-center-site-line-network-switch identifier which matches one of the plurality of network-switch identifiers stored in the forwarding database, to fetch from the forwarding database, one of the plurality of line addresses which corresponds to the matching network-switch identifier, and to store the fetched line address into the data-center-site-line-address storage, as the data-center-site-line address.

According to a fifth mode of the invention, there is provided the communication network system according to the third or fourth mode, wherein each local-branch-site-line network switch further comprises a second flag-setter configured to set a second flag A for or add the first flag A to each of packets whose destination address matches the data-center-site-line address, the data-center-site-line network switch further comprises:

a third flag-setter configured to set a third flag B for or add the third flag B to each of packets which are to be forwarded to the carrier network; and a flag resetter configured to reset the second and third flags A and B of or remove the second and third flags A and B from each of packets which have been forwarded from the carrier network, each local-branch-site-line network switch further comprises:

a misbehaving-packet bandwidth limiter configured to narrow significantly or block a transmission bandwidth for packets received;

a second flag checker configured to transfer to the first bandwidth controller, the second bandwidth controller or the misbehaving-packet bandwidth limiter, packets forwarded from the carrier network, such that, selected ones of the packets, whose second or third flag A or B is not set, are transferred to the first bandwidth controller; selected ones of the received packets, whose third flag B is set, are transferred to the second bandwidth controller; while selected ones of the packets, whose second flag A is set, are transferred to the misbehaving-packet bandwidth limiter; and a second flag-resetter configured to reset the second and third flags A and B or remove the second and third flags A and B from the packets.

According to a sixth mode of the invention, there is provided the communication network system according to the first mode, wherein each local-branch-site-line network switch further comprises a data-center-site-line-carrier-MAC (Media Access Control)-address storage for storing a data-center-site-line-carrier-MAC address for identifying the data-center-site-line network switch, the destination-node identifying section is configured to transfer packets to the first or second bandwidth controller, such that packets whish are to be transferred and each of which has a destination address matching the data-center-site-line-carrier-MAC address, are transferred to the second bandwidth controller, while packets which are to be transferred, and each of which has a destination address not matching the data-center-site-line-carrier-MAC address, are transferred to the first bandwidth controller, and the source-node identifying section is configured to transfer packets to the first or second bandwidth controller, such that packets each of which has a source address matching the data-center-site-line-carrier-MAC address, are transferred to the second bandwidth controller, while packets each of which has a source address not matching the data-center-site-line-carrier-MAC address, are transferred to the first bandwidth controller.

According to a seventh mode of the invention, there is provided the communication network system according to the first aspect or anyone of the first through sixth modes, wherein the packets include a first group of packets assigned the local-branch-site-line bandwidth α, and a second group of packets assigned the data-center-site-line bandwidth β, in accordance with user entry into an operator console, the first and second groups are assigned different levels of priorities, in a variable manner, and each of the first and second bandwidth controllers of each local-branch-site-line network switch further comprises a priority-queuing section configured to queue the first and second groups, such that one of the first and second groups which is at a higher level of priority is directed to one of a plurality of priority queues which is higher in priority than others.

According to an eighth mode of the invention, there is provided the communication network system according to the first aspect or any one of the first through seventh modes, wherein the data-center-site-line bandwidth β is equal to a physical interface bandwidth for the local-branch-site lines.

According to a ninth mode of the invention, there is provided the communication network system according to the first aspect or any one of the first through eighth modes, wherein each local-branch-site-line network switch is configured to limit a transmission bandwidth of each of all of outbound packets to the local-branch-site-line bandwidth α, the outbound packets forwarded from the instant local-branch-site-line network switch to the carrier network, and each local-branch-site-line network switch is further configured to limit a transmission bandwidth of each of inbound packets forwarded from the carrier network to the instant local-branch-site-line network switch, such that a transmission bandwidth of each of selected ones of the inbound packets, each of which has been sourced from the instant local-branch-site-line network switch or other local-branch-site-line network switches, becomes the local-branch-site-line bandwidth α, while a transmission bandwidth of each of selected ones of the inbound packets, each of which has been sourced from the data-center-site-line network switch, becomes the data-center-site-line bandwidth β.

According to a tenth mode of the invention, there is provided the communication network system according to the first aspect or any one of the first through eighth modes, wherein each local-branch-site-line network switch is configured to limit a transmission bandwidth of each of outbound packets forwarded from the instant local-branch-site-line network switch to the carrier network, such that a transmission bandwidth of each of selected ones of the outbound packets, each of which is destined for the instant local-branch-site-line network switch or other local-branch-site-line network switches, becomes the local-branch-site-line bandwidth α, while a transmission bandwidth of each of selected ones of the outbound packets, each of which is destined for the data-center-site-line network switch, becomes the data-center-site-line bandwidth β, and each local-branch-site-line network switch is further configured to limit a transmission bandwidth of each of all of inbound packets to the local-branch-site-line bandwidth α, wherein the inbound packets are forwarded from the carrier network to the instant local-branch-site-line network switch.

According to an eleventh mode of the invention, there is provided the communication network system according to the first aspect or any one of the first through tenth modes, wherein the carrier network has first and second sub-networks, and the communication network system is configured such that the plurality of local-branch-site-line network switches are interconnected via the first sub-network, and such that the plurality of local-branch-site-line network switches and the data-center-site-line network switch are interconnected via the second sub-network.

According to a twelfth mode of the invention, there is provided a network switch connected with a carrier network, comprising:

a local-branch-site-line-interface-function element configured to implement the same function as each of the plurality of local-branch-site-line network switches included in the communication network system defined in the first aspect or any one of the first through eleventh modes; and a data-center-site-line-interface-function element configured to implement the same function as the data-center-site-line network switch included in the communication network system defined in the first aspect or any one of the first through eleventh modes.

According to a thirteenth mode of the invention, there is provided the network switch according to the twelfth mode, further comprising a looping-back section configured to operate, when an inbound packet which is to be forwarded to the carrier network has a destination address matching a line address of the local-branch-site-line-interface-function element or the data-center-site-line-interface-function element within the instant network-switch, such that the inbound packet is looped back to a corresponding one of the local-branch-site-line-interface-function element and the data-center-site-line-interface-function element, so as to acting as an outbound packet which has been forwarded from the carrier network.

Several presently preferred embodiments of the invention will be described in more detail by reference to the drawings in which like numerals are used to indicate like elements throughout.

Figure 2:
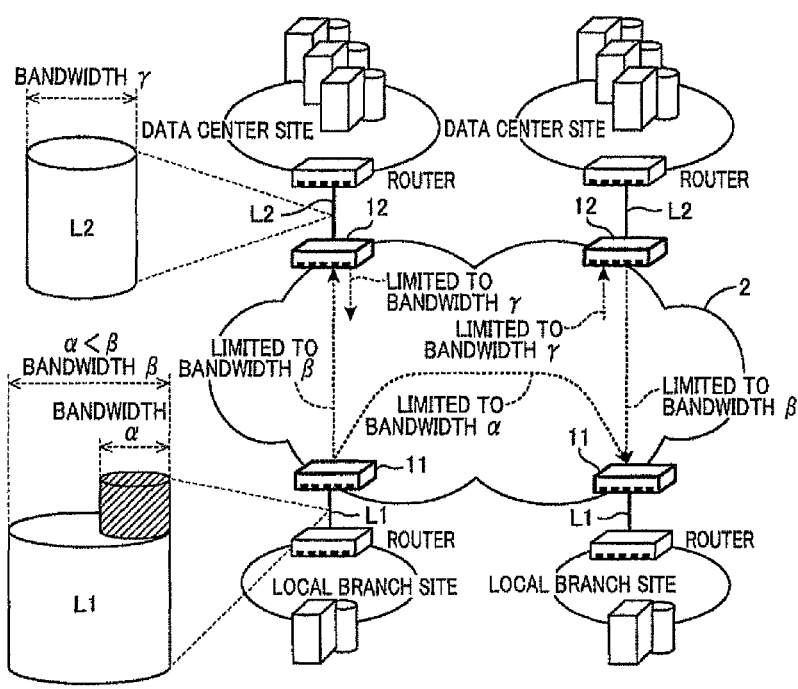
FIG. 2 is a schematic view illustrating essential processes of a bandwidth control method which is common to communication network systems constructed according to first through eighth illustrative embodiments of the present invention.

Referring now to FIG. 2, a schematic view is illustrated for explanation of fundamental features of a transmission bandwidth control or dynamic allocation method which is shared between communication network systems configured according to first through eighth illustrative embodiments of the invention.

Each of the communication network systems constructed according to the first through eighth embodiments of the invention, is configured such that, via a carrier network (i.e., a network administered by a telecommunication company) 2, a plurality of local-branch-site-line network switches 11 accommodating a plurality of local-branch-site lines (hereinafter, denoted as "Line 1" in the relevant drawings) connecting to local branch sites, respectively, and at least one data-center-site-line network switch 12 accommodating at least one data-center-site line (hereinafter, denoted as "Line 2" in the relevant drawings) connected to a data center site, are interconnected for wired or wireless transmission. Each network switch 11, 12 is a computer networking device that connects different networks.

A user or customer (e.g., an enterprise or any other type of entity) can select one of a local-branch-site line and a data-center-site line, as an available communication line at each site (e.g., the data center site or one of the local branch sites, which belong to the same enterprise), on a per-site basis.

The operational mode of bandwidth control and the available bandwidth at each site are flexibly determined depending on the characteristic of communication traffic between the own site and another site acting as a source device or a destination device to the own site.

Each local-branch-site-line network switch 11 is configured to limit transmission bandwidths, in the following manner:

(1) for communication with other local-branch-site-line network switches 11, the available bandwidth becomes a "local-branch-site-line bandwidth α," which is a first contracted bandwidth to the user; and (2) for communication with the data-center-site-line network switch 12, the available bandwidth becomes a "data-center-site-line bandwidth β," which is a second contracted bandwidth to the user, and which is broader than the local-branch-site-line bandwidth α.

In addition, the data-center-site-line network switch 12 is configured to limit a bandwidth for communications with each local-branch-site-line network switch 11, to a "data-center-site-line bandwidth γ," which is a third contracted bandwidth to the user.

The "data-center-site-line bandwidth β" of each local-branch-site-line network switch 11 may be assigned the bandwidth of a physical interface for the local-branch-site lines. For example, the data-center-site-line bandwidth β may be assigned the bandwidth of a physical interface such as 32 Mbps, 64 Mbps or 100 Mbps.

Now, the term "contracted bandwidth" will be elaborated below.

As illustrated in FIG. 2, in the communication network systems according to the first through eighth embodiments of the invention, a data center site having a centralized data resource, and a plurality of local branch sites utilizing the data resource participate in the carrier network 2.

Traditionally, a telephone-line cost incurred for the carrier network 2 was calculated depending on the bandwidth of a telephone line with which each site (i.e., the data center site or one of the local branch sites) is linked. More specifically, the user has to pay the telephone-line cost calculated depending on the number of sites participating in the carrier network 2, and the individual bandwidths of the sites. According to this conventional scheme, the telephone-line cost does not depend on whether each site linked with the carrier network 2 is the data center site (participating in the data center site line) or one of the local branch sites (participating in the local branch site lines).

In contrast, the first through eighth embodiments of the invention allows the "contracted bandwidth" between the first contracted bandwidth for the "local-branch-site lines" with which the local branch sites are linked, and the second contracted bandwidth for the "data-center-site line" with which the data center site is linked, to be distinguished from each other.

As a result, the first through eighth embodiments of the invention allows a customer to contract with the carrier, for each local-branch--site-line network switch 11, so that the "local-branch-site-line bandwidth α" which is used for communications with other local-branch-site-line network switches 11, and the "data-center-site-line bandwidth β" which is used for communications with the data-center-site-line network switch 12, can be assigned separately from or independently of each other.

On the other hand, the first through eighth embodiments of the invention allows a customer to contract with the carrier, for the data-center-site-line network switch 12, so that the "data-center-site-line bandwidth γ" which is used for communications with the local-branch-site-line network switches 11 may be available.

This arrangement allows the user to rent the carrier network 2 in desired configuration defined by selecting one of various combinations of the local-branch-site lines and the data-center-site line, so as to satisfy the amount of the estimated traffic between the data center site and the local branch sites, and the amount of the estimated traffic between different ones of the local branch sites.

Figure 3:
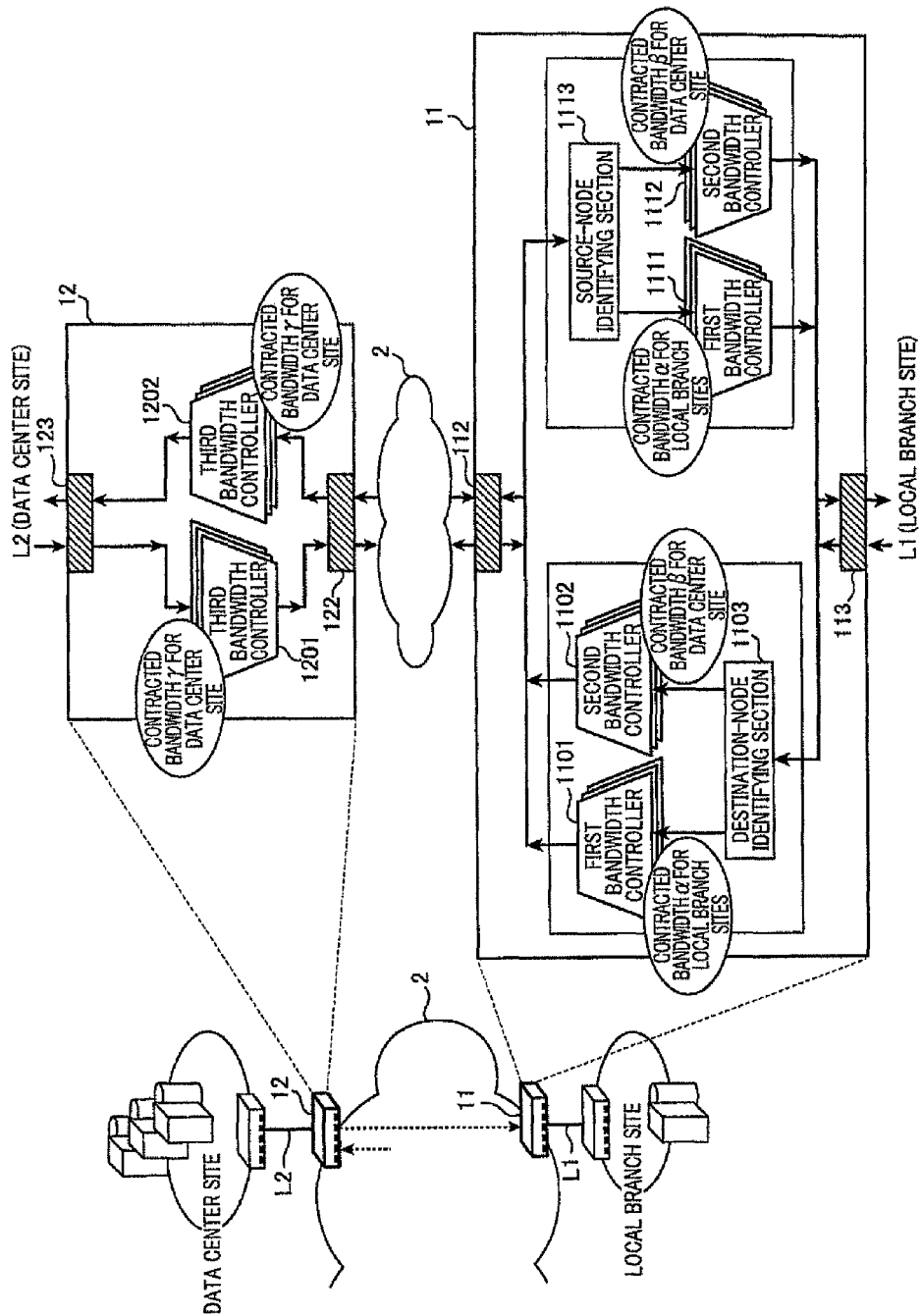
FIG. 3 is a schematic view illustrating essential functions of local-branch-site-line network switches and a data-center-site-line network switch, all of which are common to the communication network systems constructed according to the first through eighth illustrative embodiments of the present invention.

Referring next to FIG. 3, a schematic view is illustrated for explanation of fundamental functions of the local-branch-site-line network switches 11 and the data-center-site-line network switch 12, which are shared between the communication network systems configured according to the first through eighth embodiments of the invention.

Each local-branch-site-line network switch 11 incorporates a carrier-network port 112 and a local-branch-site-line port 113. Each local-branch-site-line network switch 11 further incorporates a first bandwidth controller 1101, a second bandwidth controller 1102, and a destination-node identifying section 1103, all for processing packets flowing from a corresponding one of the local-branch-site lines, to the carrier network 2. Each local-branch-site-line network switch 11 still further incorporates a first bandwidth controller 1111, a second bandwidth controller 1112, and a source-node identifying section 1113, all for processing packets flowing from the carrier network 2 to the corresponding local-branch-site line.

These functions of each local-branch-site-line network switch 11 are implemented by causing a processor (not shown) built in each local-branch-site-line network switch 11, to execute a particular program (not shown) which has been stored in a non-transitory storage medium (not shown), such as a ROM or a CD-ROM.

The destination-node identifying section 1103 of each local-branch-site-line network switch 11 is configured to transfer to the first or second bandwidth controller 1101, 1102, packets forwarded from a corresponding one of the plurality of local-branch-site lines, such that, selected ones of the packets, each of which is destined for the other local-branch-site-line network switches 11, are transferred to the first bandwidth controller 1101, while selected ones of the packets, each of which is destined for the data-center-site-line network switch 12, are transferred to the second bandwidth controller 1102. In response, the first bandwidth controller 1101 operates to limit a transmission bandwidth of each of packets transferred from the destination-node identifying section 1103, to the local-branch-site-line bandwidth α, while the second bandwidth controller 1102 operates to limit a transmission bandwidth of each of packets transferred from the destination-node identifying section 1103, to the data-center-site-line bandwidth β.

The source-node identifying section 1113 of each local-branch-site-line network switch 11 is configured to transfer to the first or second bandwidth controller 1111, 1112, packets forwarded from the carrier network 2, such that, selected ones of the packets, each of which is sourced from the other local-branch-site-line network switches 11, are transferred to the first bandwidth controller 1111, while selected ones of the packets, each of which is sourced from the data-center-site-line network switch 12, are transferred to the second bandwidth controller 1112. In response, the first bandwidth controller 1111 operates to limit a transmission bandwidth of each of packets transferred from the destination-node identifying section 1113, to the local-branch-site-line bandwidth α, while the second bandwidth controller 1112 operates to limit a transmission bandwidth of each of packets transferred from the destination-node identifying section 1113, to the data-center-site-line bandwidth β.

In the alternative, the first bandwidth controllers 1101 and 1111 and the second bandwidth controllers 1102 and 1112 in each local-branch-site-line network switch 11 may be configured to perform priority-based bandwidth control, that is, priority queuing for packets.

More specifically, when the data-center-site-line bandwidth is pre-selected as a prioritized bandwidth, communications between one of the local-branch-site-line network switches 11 and the data-center-site-line network switch 12 is prioritized, and, on the other hand, when the local-branch-site-line bandwidth α is pre-selected as a. prioritized bandwidth, communications between two of the local-branch-site-line network switches 11 is prioritized.

Still more specifically, the packets include a first group of packets assigned the local-branch-site-line bandwidth α, and a second group of packets assigned the data-center-site-line bandwidth β. In accordance with user entry into an operator console 118 (see FIG. 4), the first and second groups are assigned different levels of priorities, in a variable manner. Each of the first bandwidth controllers 1101 and 1111, and the second bandwidth controllers 1102 and 1112 of each local-branch-site-line network switch 11 further includes a priority-queuing section configured to queue the first and second groups, such that one of the first and second groups which is at a higher level of priority is directed to one of a plurality of priority queues which is higher in priority than others.

The data-center-site-line network switch 12 incorporates a carrier-network port 122 and a data-center-site-line port 123. The data-center-site-line network switch 12 further incorporates a third bandwidth controller 1201, for processing packets flowing from the data-center-site line to the carrier network 2. The data-center-site-line network switch 12 still further incorporates a third bandwidth controller 1202, for processing packets flowing from the carrier network 2 to the data-center-site line. The third bandwidth controllers 1201 and 1202 operate to limit a transmission bandwidth of each of packets received, to the data-center-site-line bandwidth γ.

[First Illustrative Embodiment]

Figure 4:
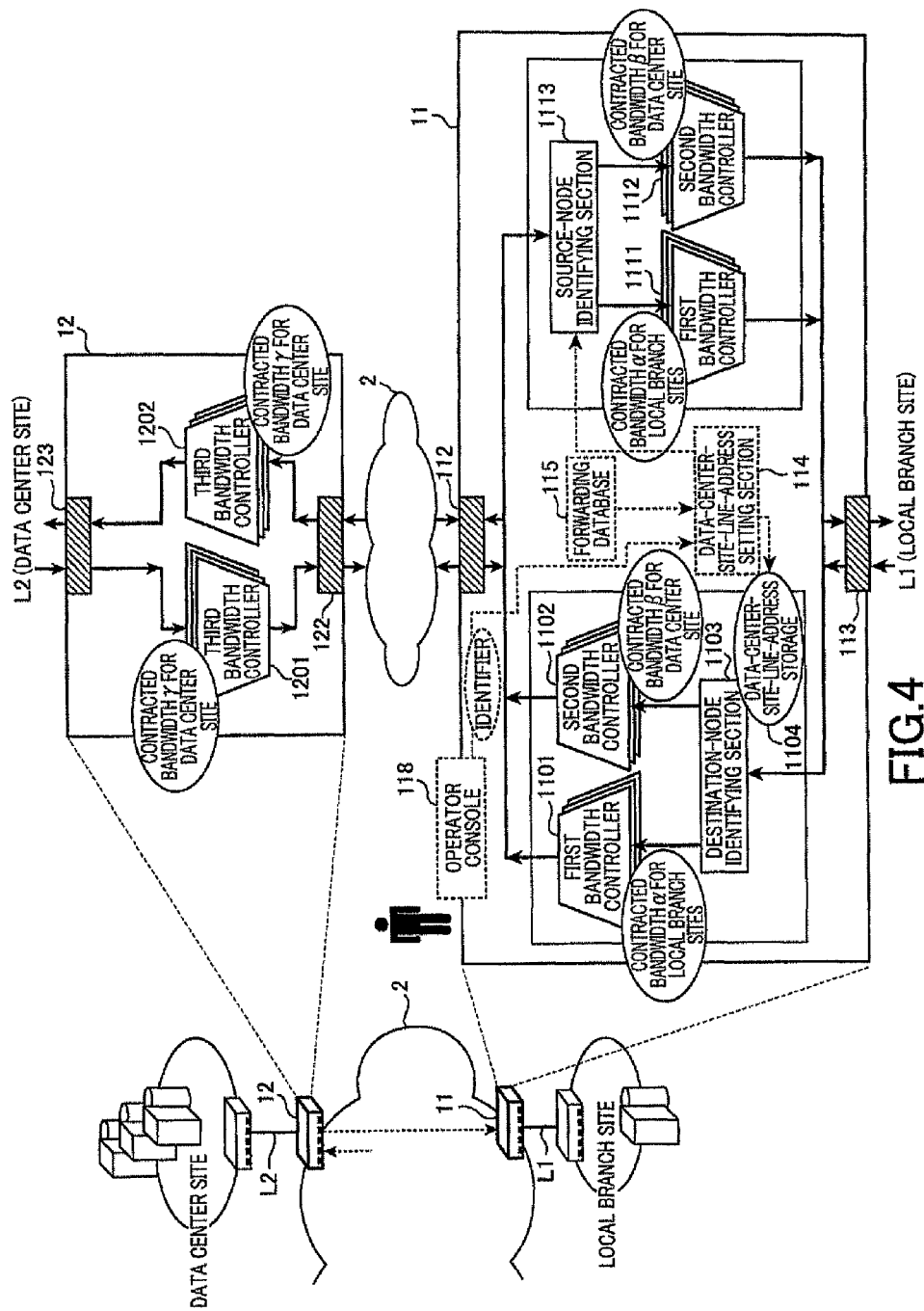
FIG. 4 is a schematic view illustrating in more detail the local-branch-site-line network switches and the data-center-site-line network switch, all of which are constructed according to the first illustrative embodiment of the present invention.

Referring next to FIG. 4, a schematic view is illustrated for detailed explanation of a representative one of the local-branch-site-line network switches 11, and the data-center-site-line network switch 12, all of which are constructed according to the first embodiment of the invention.

As illustrated in FIG. 4, each local-branch-site-line network switch 11 incorporates, in addition to the fundamental elements illustrated in FIG. 3, a data-center-site-line-address storage 1104, a data-center-site-line-address setting section 114, and a forwarding database 115.

The data-center-site-line-address storage 1104 of each local-branch-site-line network switch 11 is for storing a data-center-site-line address corresponding to a device (although not shown, it is a communication terminal, for example) or a network (although not shown, it is a Local Area Network (LAN), for example) connected to the data-center-site-line network switch 12 via the data-center-site line. The data-center-site-line address stored in the data-center-site-line-address storage 1104 is referenced by the destination-node identifying section 1103. The destination-node identifying section 1103 is configured to transfer packets to the first or second bandwidth controller 1101, 1102, such that packets each having a destination address which does not match the data-center-site-line address, are transferred to the first bandwidth controller 1101, while packets each having a destination address which matches the data-center-site-line address are transferred to the second bandwidth controller 1102.

This configuration allows an available transmission bandwidth to vary depending on whether each packet is destined for one of the other local-branch-site-line network switches 11 or the data-center-site-line network switch 12.

As illustrated in FIG. 12 in table format, the forwarding database 115 stores therein a plurality of network-switch identifiers of network switches (including the local-branch-site-line network switches 11 and the data-center-site-line network switch 12) and a plurality of line addresses corresponding to devices or networks connected to the network switches via corresponding respective lines (including the local-branch-site lines and the data-center-site line), in association with each other. Each network-switch identifier is defined to indicate a value which is to be referenced for uniquely identifying a corresponding one of the network switches (i.e., one of the local-branch-site-line network switches 11, or the data-center-site-line network switch 12). The value may take the form of, for example, an MPLS (Multi Protocol Label Switching) label, or a carrier MAC (Media Access Control) address in a MAC-in-MAC frame.

Into the data-center-site-line-address setting section 114, a data-center-site-line network-switch identifier is entered in response to an entry action through an operator console 118 by the carrier's operator.

More specifically, in an exemplary scenario where a data-center-site-line network-switch identifier β is entered, the data-center-site-line-address setting section 114 operates to fetch destination addresses "CCC" and "DDD" from the forwarding database 115, both of which match the entered data-center-site-line network-switch identifier β. Then, the data center site-line-address setting section 114 operates to store the fetched line addresses "CCC" and "DDD" into the data-center-site-line-address storage 1104, each as the data-center-site-line address.

At least one data-center-site-line address stored in the data-center-site-line-address storage 1104 is referenced also by the source-node identifying section 1113. The source-node identifying section 1113 of each local-branch-site-line network switch 11 is configured to transfer packets to the first or second bandwidth controller 1111, 1112, such that packets each having a source address which does not match the data-center-site-line address are transferred to the first bandwidth controller 1111, while packets each having a source address which matches the data-center-site-line address are transferred to the second bandwidth controller 1112.

[Second Illustrative Embodiment]

Figure 5:
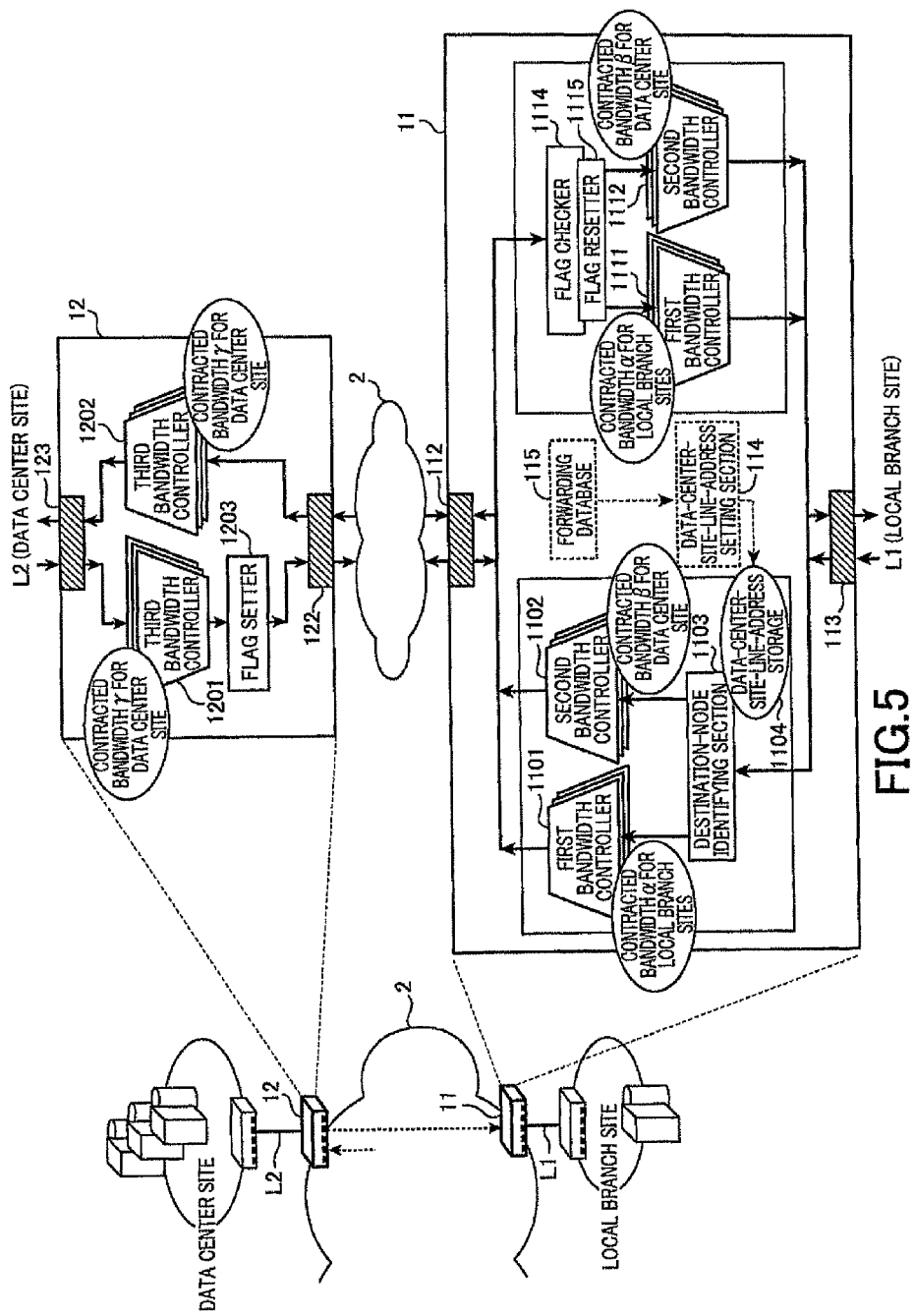
FIG. 5 is a schematic view illustrating in more detail the local-branch-site-line network switches and the data-center-site-line network switch, all of which are constructed according to the second illustrative embodiment of the present invention.

Referring next to FIG. 5, a schematic view is illustrated for detailed explanation of a representative one of the local-branch-site-line network switches 11, and the data-center-site-line network switch 12, all of which are constructed according to the second embodiment of the invention. While the present embodiment will be described below, the same reference numerals or names as those in the description and illustration of the first embodiment refer to the individual elements to those of the first embodiment, to avoid redundant descriptions and illustration.

As illustrated in FIG. 5, each local-branch-site-line network switch 11, as described in comparison with the first embodiment illustrated in FIG. 4, is configured to incorporate a flag checker 1114 and a flag resetter 1115, to replace the source-node identifying section 1113 depicted in FIG. 4. The data-center-site-line network switch 12 is configured to incorporate a flag setter 1203 as an additional element.

For conveying flag information, a particular value is given to the ToS (Type of Service) field in the IPv4 (Internet Protocol version 4) header, the TC (Traffic Class) field in the IPv6, the CoS (Class of Service) field of the Ethernet (Registered Trademark), the Exp (Experimental) field of the MPLS (Multi Protocol Label Switching), or the like.

The flag setter 1203 of the data-center-site-line network switch 12 is configured to set a flag for or add the flag to each of which have been transferred from the third bandwidth controller 1201 and which are to be forwarded to the carrier network 2. In an example, the addition of the flag to each packet refers to addition of an additional flag bit area to each packet. A packet being flagged indicates that the packet is being transferred from the data-center-site-line network switch 12 to one of the local-branch-site-line network switches 11. The flagged packet is sent via the carrier network 2 to one of the local-branch-site-line network switches 11.

The flag checker 1114 of each local-branch-site-line network switch 11 replaces the source-node identifying section 1113 depicted in FIG. 3. The flag checker 1114 is configured to determine whether each packet forwarded from the carrier network 2 has been flagged or not. The flag checker 1114 is further configured to transfer each packet not having been flagged to the first bandwidth controller 1111, and to transfer each packet having been flagged to the second bandwidth controller 1112.

Just before each packet goes out from the flag checker 1114, the flag resetter 1115 resets the flag of or removes the flag from each outgoing packet. In an example, the removal of the flag from each packet refers to removal of the previously-added additional flag bit area from each packet, resulting in restoration of each packet in data structure.

[Third Illustrative Embodiment]

Figure 6:
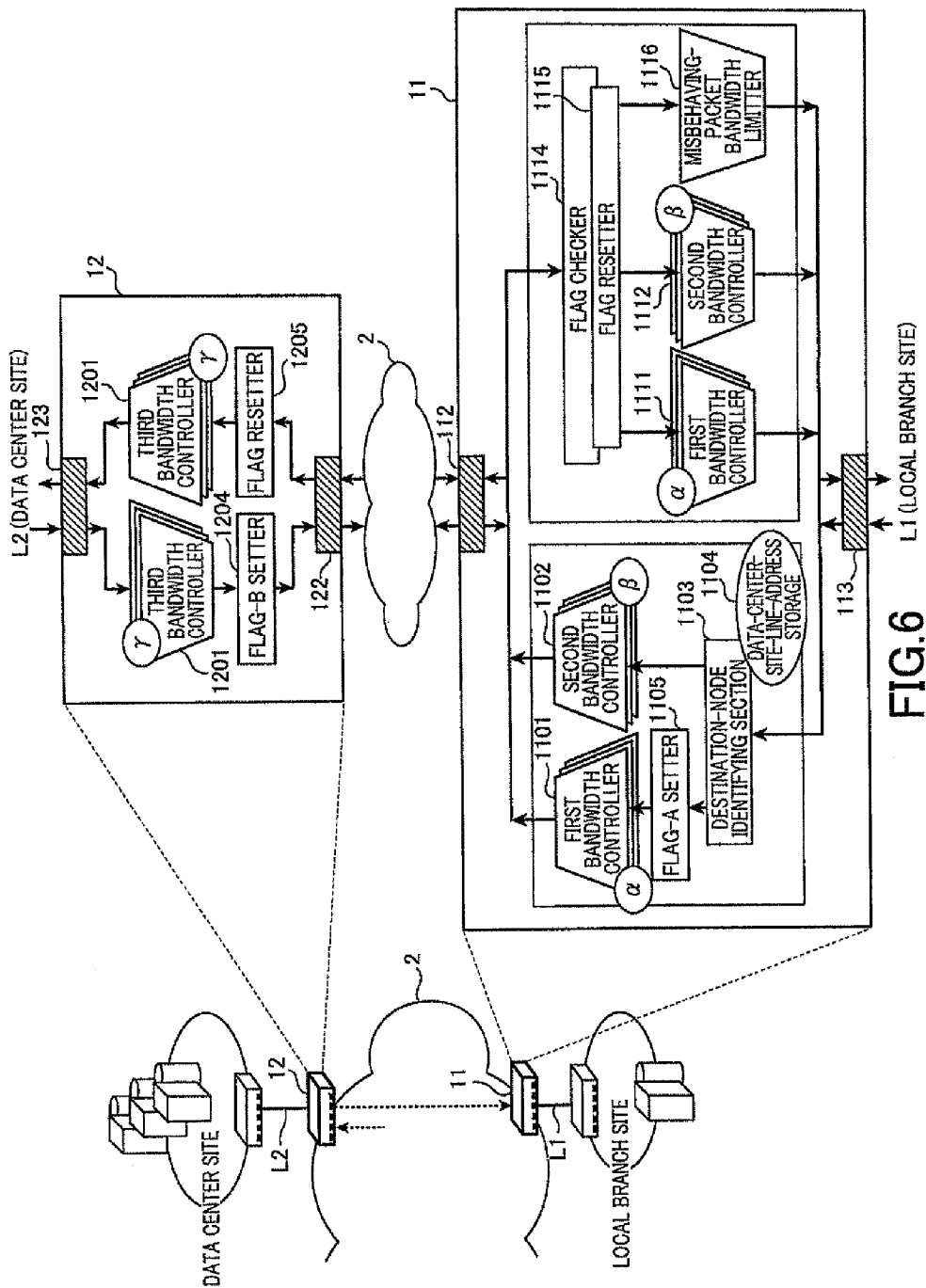
FIG. 6 is a schematic view illustrating in more detail the local-branch-site-line network switches and the data-center-site-line network switch, all of which are constructed according to the third illustrative embodiment of the present invention.

Referring next to FIG. 6, a schematic view is illustrated for detailed explanation of a representative one of the local-branch-site-line network switches 11, and the data-center-site-line network switch 12, all of which are constructed according to the third embodiment of the invention. While the present embodiment will be described below, the same reference numerals or names as those in the description and illustration of the first embodiment refer to the individual elements to those of the first embodiment, to avoid redundant descriptions and illustration.

As illustrated in FIG. 6, each local-branch-site-line network switch 11, as described in comparison with the second embodiment illustrated in FIG. 5, is configured to incorporate a flag-A setter (i.e., an exemplary second flag setter) 1105 and a misbehaving-packet bandwidth limiter 1116, each as an additional element. The data-center-site-line network switch 12 is configured to incorporate a flag-B setter (i.e., an exemplary third flag setter) 1203 and a flag resetter (i.e., an exemplary first flag resetter) 1205, each as an additional element.

The flag-A setter 1105 of each local-branch-site-line network switch 11 is configured to set a first flag A of or add the first flag A to each of packets whose destination address matches the data-center-site-line address. Setting or adding the first flag A for each packet indicates each packet flows from one of the local-branch-site-line network switches 11 to the data-center-site-line network switch 12.

On the other hand, the flag-B setter 1204 of the data-center-site-line network switch 12 is configured to set a second flag B of or add the second flag B to each of packets which are to be sent to the carrier network 2. Setting or adding the second flag B for each packet indicates each packet flows from the data-center-site-line network switch 12 to one of the local-branch-site-line network switches 11. The flag resetter 1205 of the data-center-site-line network switch 12 is configured to reset the first and second flags A and B of or remove the first and second flags A and B from each of packets which have been forwarded from the carrier network 2.

Each local-branch-site-line network switch 11 is configured to incorporate the misbehaving-packet bandwidth limiter 1116, in parallel to the first and second bandwidth controllers 1111 and 1112. The misbehaving-packet bandwidth limiter 1116 is configured to narrow significantly or block a transmission bandwidth for packets received. The flag resetter 1115 (i.e., an exemplary second flag resetter) resets the first flag A and the second flag B of or remove the first flag A and the second flag B from each outgoing packet from the flag checker 1114.

The flag checker 1114 (i.e., an exemplary second flag checker) of each local-branch-site-line network switch 11 is configured to sort packets forwarded from the carrier network 2, in the following manner:

(1) If a packet does not have the first flag A or the second flag B, then the packet is transferred to the first bandwidth controller 1111;

(2) If a packet has only the second flag B, then the packet is transferred to the second bandwidth controller 1112; and (3) If a packet has only the first flag A, then the packet is transferred to the misbehaving-packet bandwidth limiter 1116.

The reason is that a packet having the first flag A should have been transferred to the data-center-site-line network switch 12, and arrival of such a packet at each local-branch-site-line network switch 11 implies that such a packet has arrived at each local-branch-site-line network switch 11 as a misbehaving packet.

[Fourth Illustrative Embodiment]

Figure 7:
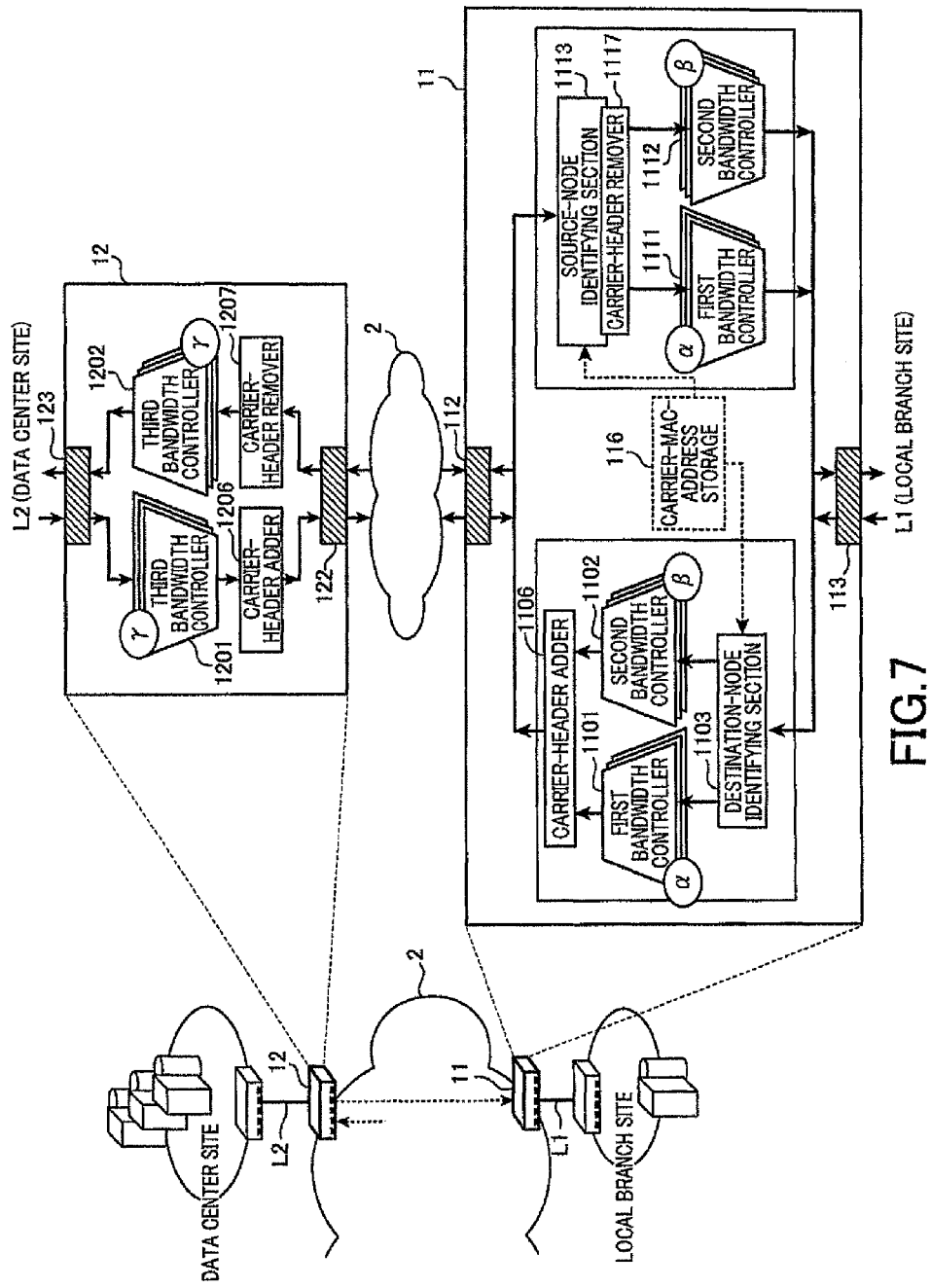
FIG. 7 is a schematic view illustrating in more detail the local-branch-site-line network switches and the data-center-site-line network switch, all of which are constructed according to the fourth illustrative embodiment of the present invention.

Referring next to FIG. 7, a schematic view is illustrated for detailed explanation of a representative one of the local-branch-site-line network switches 11, and the data-center-site-line network switch 12, all of which are constructed according to the fourth embodiment of the invention. While the present embodiment will be described below, the same reference numerals or names as those in the description and illustration of the first embodiment refer to the individual elements to those of the first embodiment, to avoid redundant descriptions and illustration.

As illustrated in FIG. 7, the present embodiment employs the "MAC-in-MAC" technology. As illustrated in FIG. 7, each local-branch-site-line network switch 11 is configured to incorporate, in addition to the fundamental elements depicted in FIG. 3, a carrier-MAC-address storage (i.e., an exemplary data-center-site-line-carrier-MAC (Media Access Control)-address storage) 116, a carrier-header adder 1106, and a carrier-header remover 1117, each as an additional element. The data-center-site-line network switch 12 is configured to incorporate a carrier-header adder 1206 and a carrier-header remover 1207, each as an additional element.

The "MAC-in-MAC" technology refers to Wide Area Ethernet (Registered Trademark) technology which allows MAC frames to be transported in MAC-in-MAC encapsulation, which is standardized as IEEE 802.1ah.

Traditionally, core switches within the carrier network 2 were required to learn MAC addresses for all users (all devices at all sites), with flooded MAC addresses registered in an address table. In contrast, the "MAC-in-MAC" technology allows the core switches within the carrier network 2 to learn only addresses (i.e., carrier-MAC addresses) of switches at the edges of the carrier network 2.

The carrier-MAC-address storage 116 has stored therein a data-center-site-line-carrier-MAC address for identifying the data-center-site-line network switch 12.

The destination-node identifying section 1103 is configured to transfer to the second bandwidth controller 1102, packets which are to be transferred and each of which has a destination address matching the data-center-site-line-carrier-MAC address. The destination-node identifying section 1103 is further configured to transfer to the first bandwidth controller 1101, packets which are to be transferred and each of which has a destination address not matching the data-center-site-line-carrier-MAC address.

The carrier-header adder 1106 of each local-branch-site-line network switch 11 is configured to add to a packet went out from the first bandwidth controller 1101, a carrier-MAC header indicating that the packet is destined for one of the other local-branch-site-line network switches 11, and then transfer the packet. The carrier-header adder 1106 is further configured to add to a packet went out from the second bandwidth controller 1102, a carrier-MAC header indicating that the packet is destined for the data-center-site-line network switch 12, and then transfer the packet.

The source-node identifying section 1113 is configured to transfer to the second bandwidth controller 1112, packets each of which has a source address matching the data-center-site-line-carrier-MAC address. The source-node identifying section 1113 is further configured to transfer to the first bandwidth controller 1111, packets each of which has a source address not matching the data-center-site-line-carrier-MAC address.

The carrier-header adder 1206 of the data-center-site-line network switch 12 is configured to add to a packet which is destined for the carrier network 2 and which went out from the third bandwidth controller 1201, a carrier-MAC header indicating that the source address of the packet matches the data-center-site-line-carrier-MAC address, and then transfer the packet. The carrier-header remover 1207 is configured to remove the carrier-MAC header from each packet forwarded from the carrier network 2, and then, transfer each packet to the third bandwidth controller 1202.

[Fifth Illustrative Embodiment]

Figure 8B:
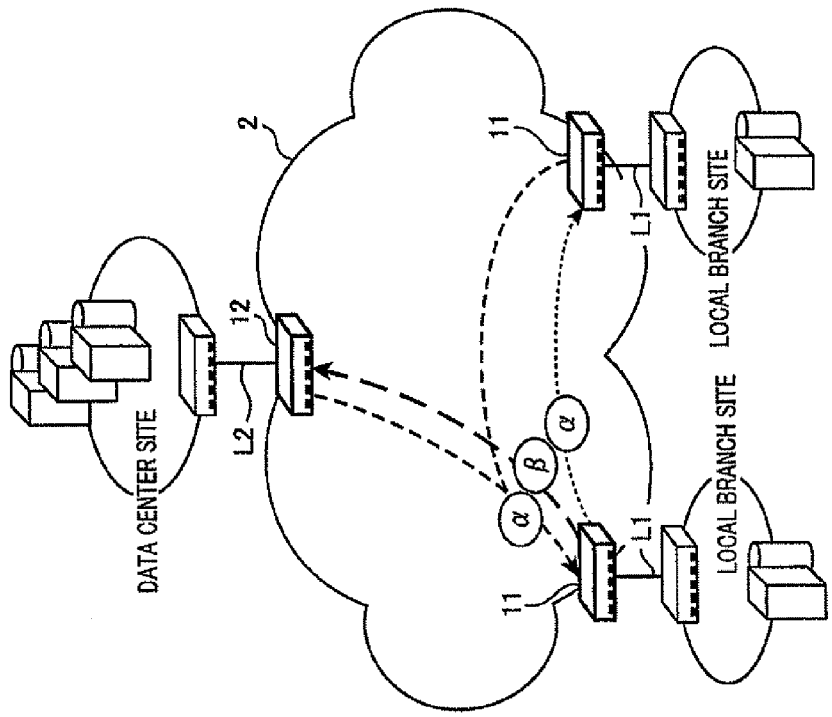
FIG. 8 is a schematic view illustrating a communication network system according to the fifth illustrative embodiment of the invention, in which inbound packets and outbound packets are transferred with different respective contracted bandwidths.
Figure 8A:
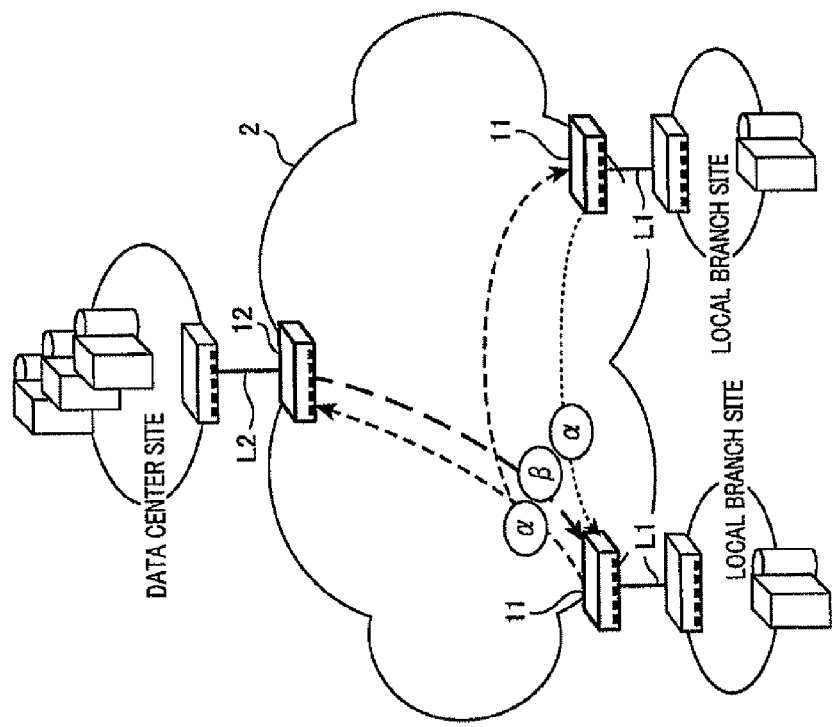

Referring next to FIGS. 8A and 8B, a schematic view is illustrated for detailed explanation of representative two of the local-branch-site-line network switches 11, and the data-center-site-line network switch 12, all of which are constructed according to the fifth embodiment of the invention. While the present embodiment will be described below, the same reference numerals or names as those in the description and illustration of the first embodiment refer to the individual elements to those of the first embodiment, to avoid redundant descriptions and illustration.

As illustrated in FIG. 8A, each local-branch-site-line network switch 11 is configured to limit a transmission bandwidth of each of all of outbound packets to the-local-branch-site-line bandwidth α. The outbound packets forwarded from the instant local-branch-site-line network switch 11 to the carrier network 2 (i.e., destined for one of the other local-branch-site-line network switches 11 or the data-center-site-line network switch 12).

Each local-branch-site-line network switch 11 is further configured to limit a transmission bandwidth of each of inbound packets forwarded from the carrier network 2 (i.e., sourced from one of the other local-branch-site-line network switches 11 or the data-center-site-line network switch 12) to the instant local-branch-site-line network switch 11, such that the transmission bandwidth of each of ones of the inbound packets, each of which has been sourced from the other local-branch-site-line network switches 11, becomes the local-branch-site-line bandwidth α, while the transmission bandwidth of each of ones of the inbound packets, each of which has been sourced from the data-center-site-line network switch 12, becomes the data-center-site-line bandwidth β. In this case, the data-center-site-line bandwidth β can be determined depending on the data amount of inbound packets flowing from the data-center-site-line network switch 12 to one of the local-branch-site-line network switches 11.

As illustrated in FIG. 8B, each local-branch-site-line network switch 11 is configured to limit a transmission bandwidth of each of outbound packets flowing from the instant local-branch-site-line network switch 11 to the carrier network 2 (i.e., destined for one of the other local-branch-site-line network switches 11 or the data-center-site-line network switch 12), such that a transmission bandwidth of each of selected ones of the outbound packets, each of which is destined for the other local-branch-site-line network switches 11, becomes the local-branch-site-line bandwidth α, while a transmission bandwidth of each of selected ones of the outbound packets, each of which is destined for the data-center-site-line network switch 12, becomes the data-center-site-line bandwidth β.

Each local-branch-site-line network switch 11 is further configured to limit a transmission bandwidth of each of all of inbound packets to the local-branch-site-line bandwidth α, the inbound packets forwarded from the carrier network 2 (i.e., sourced from one of the other local-branch-site-line network switches 11 or the data-center-site-line network switch 12) to the instant local-branch-site-line network switch 11. In this case, the data-center-site-line bandwidth β can be determined depending on the data amount of inbound packets forwarded from one of the local-branch-site-line network switches 11 to the data-center-site-line network switch 12.

[Sixth Illustrative Embodiment]

Figure 9:
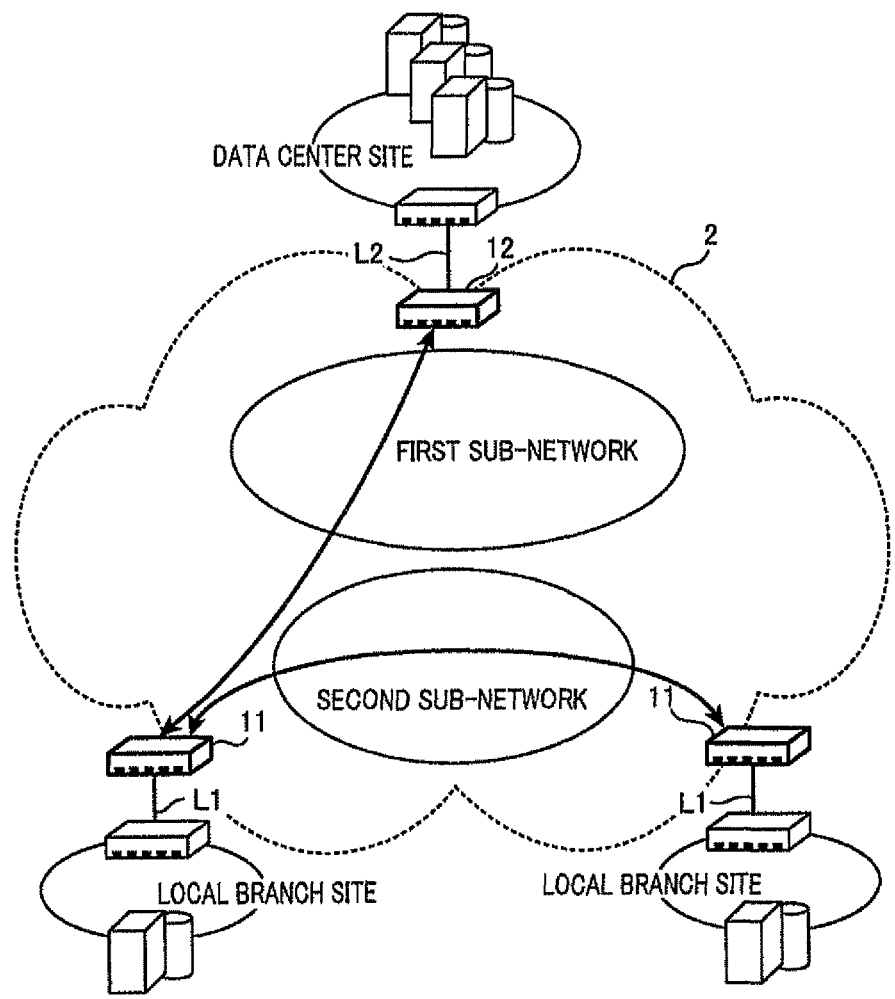
FIG. 9 is a schematic view illustrating a communication network system according to the fifth illustrative embodiment of the invention, in which a carrier network has two sub-networks.

Referring next to FIG. 9, a schematic view is illustrated of a communication network system configured such that the carrier network 2 has two sub-networks, according to the sixth embodiment of the invention. While the present embodiment will be described below, the same reference numerals or names as those in the description and illustration of the first embodiment refer to the individual elements to those of the first embodiment, to avoid redundant descriptions and illustration.

As illustrated in FIG. 9, the carrier network 2 has first and second sub-networks. The communication network system is configured such that the plurality of local-branch-site-line network switches 11 and the data-center-site-line network switch 12 are interconnected via the first sub-network, while the plurality of local-branch-site-line network switches 11 are interconnected via the second sub-network.

In an exemplary implementation, the first sub-network may be a point-to-point public communication network, while the second sub-network may be a multi-point Wide Area Ethernet (Registered Trademark) network.

[Seventh Illustrative Embodiment]

Figure 10:
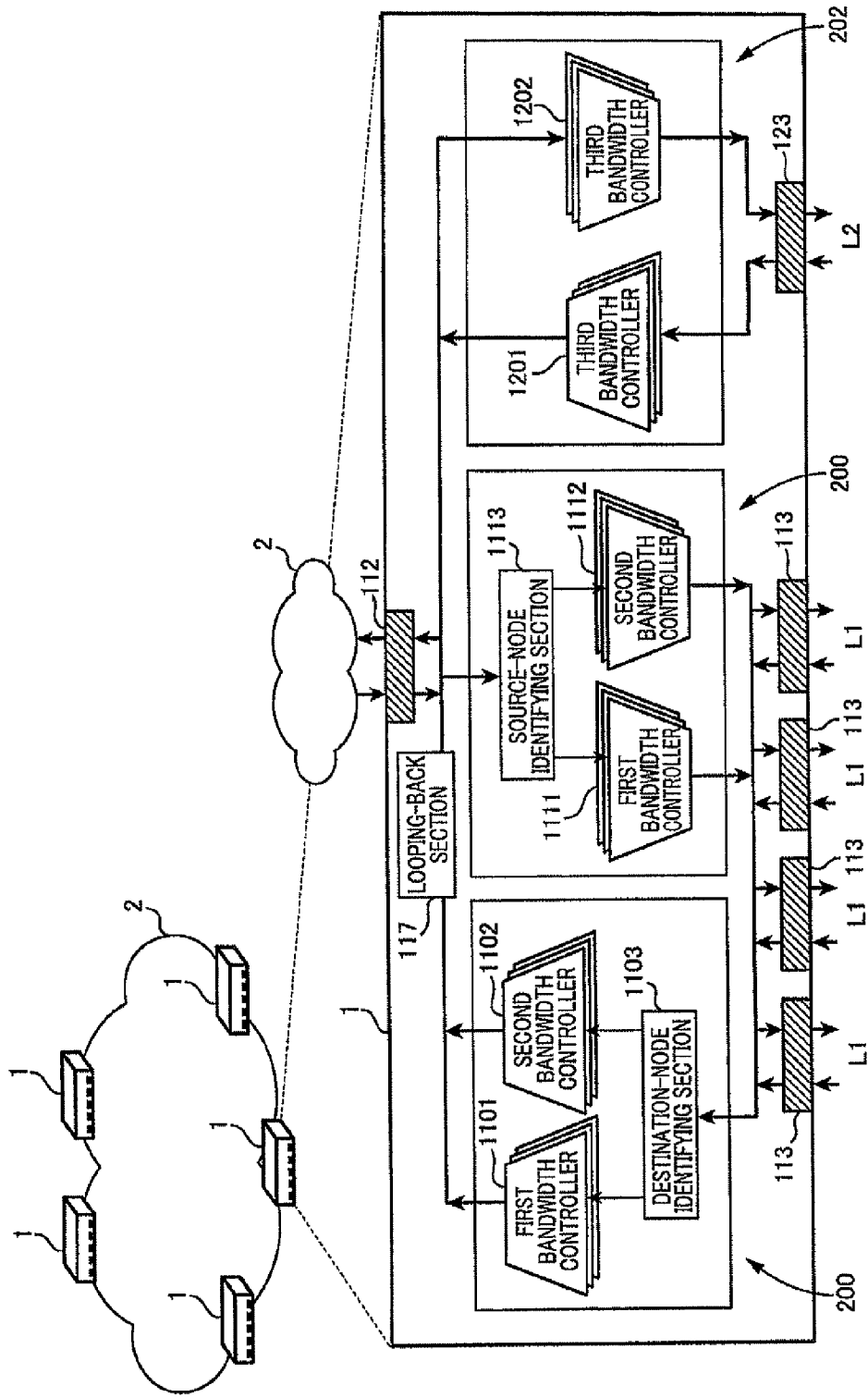
FIG. 10 is a schematic view illustrating a network switch according to the seventh illustrative embodiment of the invention, which incorporates a local-branch-site-line-interface-function element and a data-center-site-line-interface-function element.

Referring next to FIG. 10, a schematic view is illustrated of a network switch 1 configured to have an local-branch-site-site-line-interface-function element 200 and a data-center-site-line-interface-function element 202, according to the seventh embodiment of the invention, wherein the local-branch-site-line-interface-function element 200 is configured to implement the same function as each of the plurality of local-branch-site-line network switches 11 according to the preceding embodiments, and the data-center-site-line-interface-function element 202 is configured to implement the same function as the data-center-site-line network switch 12 according to the preceding embodiments. While the present embodiment will be described below, the same reference numerals or names as those in the description and illustration of the first embodiment refer to the individual elements to those of the first embodiment, to avoid redundant descriptions and illustration.

The network switch 1 illustrated in FIG. 10 is provided in the form of an edge device with regard to the carrier network 2, which allows connections with the local-branch-site lines and connections with the data-center-site line.

As illustrated in FIG. 10, the network switch 1 is equal in structure to the first through fifth embodiments, except that a looping-back section 117 is added. The looping-back section 117 stores addresses (e.g., in the form of line addresses, or line-port addresses) for identifying devices or networks linked via lines (i.e., the local-branch-site lines and the data-center-site line), on a per-line basis.

The looping-back section 117 is configured to operate, when an inbound packet which is to be forwarded to the carrier network 2 has a destination address matching an address of a device or a network linked via one of the local-branch-site lines or the data-center-site line within the instant network switch 1, such that the inbound packet is looped back to a corresponding one of the local-branch-site-line-interface-function element 200 and the data-center-site-line-interface-function element 202, so as to acting as an outbound packet which has been forwarded from the carrier network 2. The inbound packets are, for example, packets forwarded to one of the local-branch-site-line ports 113 and the data-center-site-line port 123, that is, packets forwarded from one of the local-branch-site lines and the data-center-site line. The corresponding one of the local-branch-site-line-interface-function element 200 and the data-center-site-line-interface-function element 202 is, for example, one of the local-branch-site lines and the data-center-site line, which matches the destination of the packets, that is, one of the local-branch-site lines and the data-center-site line, which matches the destination of the packets.

Thus, the looping-back section 117 allows establishment of communications between the local-branch-site lines and communications between the local-branch-site lines and the data-center-site line, without passing through the carrier network 2.

Therefore, the present embodiment, which allows packets to be looped back within the network switch 1, does not affect the network load on the carrier network 2, and shortens the time to transfer packets.

[Eighth Illustrative Embodiment]

Figure 11:
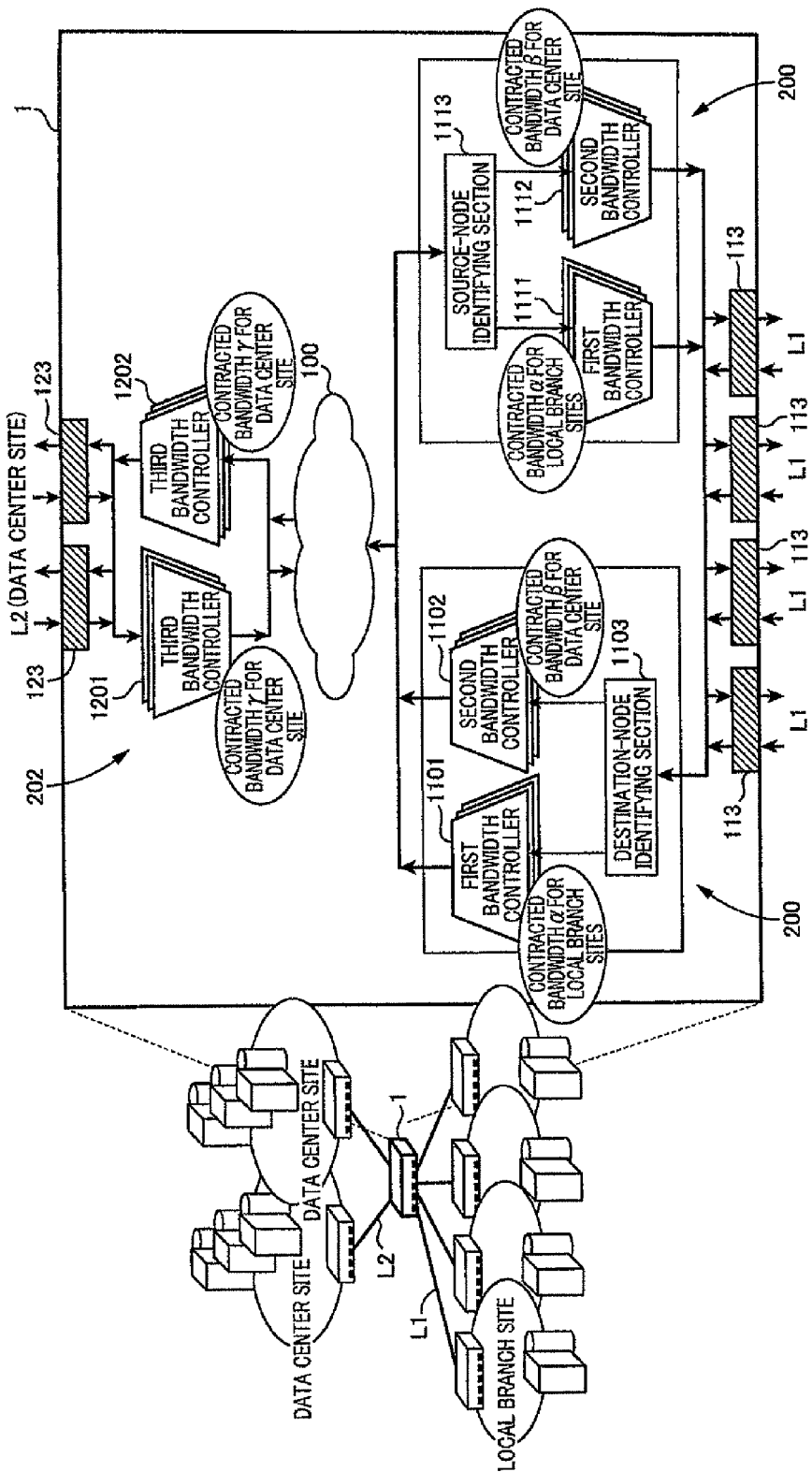
FIG. 11 is a schematic view illustrating a network switch according to the eighth illustrative embodiment of the invention, which incorporates a local-branch-site-line-interface-function element and a data-center-site-line-interface-function element.

Referring next to FIG. 11, a schematic view is illustrated of a network switch 1 configured to have an local-branch-site-line-interface-function element 200 and a data-center-site-line-interface-function element 202, according to the seventh embodiment of the invention, wherein the local-branch-site-line network switch-function element 200 is configured to implement the same function as each of the plurality of local-branch-site-line network switches 11 according to the preceding embodiments, and the data-center-site-line-interface-function element 202 is configured to implement the same function as the data-center-site-line network switch 12 according to the preceding embodiments. While the present embodiment will be described below, the same reference numerals or names as those in the description and illustration of the first embodiment refer to the individual elements to those of the first embodiment, to avoid redundant descriptions and illustration.

The network switch 1 illustrated in FIG. 11 is configured to incorporate the carrier network 2 as a switching section 100 within the instant network switch 1, to thereby connect the local-branch-site lines and the data-center-site line.

The switching section 100 allows establishment of communications between the local-branch-site lines and communications between the local-branch-site lines and the data-center-site line, without passing through the carrier network 2.

As will be evident from the foregoing, the embodiments described above allow the data-center-site line via connecting the data-center-site-line network switch 12 and the data center site is connected, and the local-branch-site lines connecting the local-branch-site-line network switches 11 and the local branch sites, to be distinguished from each other, and allow the operation modes of the bandwidth control and the contracted bandwidths, to vary between the data-center-site line and the local-branch-site lines. This results in the capability of ensuring broader bandwidths available between the data center site and each local branch site, to thereby promote resource centralization to the date center located at the data center site.

More specifically, the embodiments described above allow a carrier (i.e., a telecommunication company) and a user or customer to contract with each other for communications between the data center site and the local branch sites, so as to have adequate available bandwidths.

On the other hand, data center sites for various users (e.g., various enterprises) generally tend to be localized within a particular area (e.g., a major city). Because of this tendency, the embodiments described above make it easier for a carrier to increase the multiplicity of relay transmission lines of a VPN (Virtual Private Network) service network toward the particular area, and the accommodation ratio at which the data-center-site-line network switches 12 accommodates the data-center-site lines, resulting in the improved efficiency of the carrier's equipment investment. This can reduce the carrier's communication expenses, and in return, users are given expectations that, as the users promote the resource centralization to the date center, the users' communication costs can be reduced to a reasonable amount.

As will be evident from the foregoing, the embodiments described above, for achieving their goals, perform, by the processor, a bandwidth control method implemented in a communication network system in which the local-branch-site-line network switches 11 accommodating the local-branch-site lines, respectively, and the data-center-site-line network switch 12 accommodating the data-center-site line, are interconnected via the carrier network 2.

This method includes the steps of causing each local-branch-site-line network switch 11 to limit a bandwidth for communications between the instant local-branch-site-line network switch 11 and other local-branch-site-line network switches 11, to the local-branch-site-line bandwidth $\alpha$, and to limit a bandwidth for communications between the instant local-branch-site-line network switch 11 and the data-center-site-line network switch 12, to the data-center-site-line bandwidth $\beta$; and causing the data-center-site-line network switch 12 to limit a bandwidth for communications between the instant data-center-site-line network switch 12 and the plurality of local-branch-site-line network switches 11, to the data-center-site-line bandwidth $\gamma$.

Reference throughout the specification to "one embodiment" or "an embodiment" means that a particular feature, structure, or characteristic described in connection with the embodiment is included in at least one embodiment of the present invention.

Thus, the appearance of the phrases "in one embodiment" or "in an embodiment" in various places throughout the specification are not necessarily all referring to the same embodiment. Furthermore, the particular features, structures, or characteristics may be combined in any suitable manner in one or more embodiments.

Moreover, inventive aspects lie in less than all features of a single disclosed embodiment. Thus, the claims following the Detailed Description are hereby expressly incorporated into this Detailed Description, with each claim standing on its own as a separate embodiment of this invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A communication network system in which a plurality of local-branch-site-line network switches accommodating a plurality of local-branch-site lines, respectively, and at least one data-center-site-line network switch accommodating at least one data-center-site line, are interconnected via a carrier network, comprising:

a first bandwidth controller, disposed at each local-branch-site-line network switch, configured to limit a transmission bandwidth of each of inbound packets and/or outbound packets to a pre-selected local-branch-site-line bandwidth $\alpha$, wherein the inbound packets flow from the instant local-branch-site-line network switch or other local-branch-site-line network switches, and the outbound packets flow to the instant local-branch-site-line network switch or other local-branch-site-line network switches;

a second bandwidth controller, disposed at each local-branch-site-line network switch, configured to limit a transmission bandwidth of each of inbound packets and/or outbound packets to a pre-selected data-center-site-line bandwidth $\beta$ broader than the local-branch-site-line bandwidth $\alpha$, wherein the inbound packets flow from each of the at least one data-center-site-line network switch, and the outbound packets flow to the data-center-site-line network switch; and a third bandwidth controller, disposed at each of the at least one data-center-site-line network switch, configured to limit a transmission bandwidth of each of inbound packets and/or outbound packets to a pre-selected data-center-site-line bandwidth $\gamma$, wherein the inbound packets flow from the plurality of local-branch-site-line network switches, and the outbound packets flow to the plurality of local-branch-site-line network switches.

2. The communication network system according to claim 1, wherein each local-branch-site-line network switch further comprises a destination-node identifying section configured to transfer to the first or second bandwidth controller, packets forwarded from a corresponding one of the plurality of local-branch-site lines, such that selected ones of the packets, each of which is destined for the instant local-branch-site-line network switch or other local-branch-site-line network switches, are transferred to the first bandwidth controller, while selected ones of the packets, each of which is destined for one of the at least, one data-center-site-line network switch, are transferred to the second bandwidth controller, each of the at least one data-center-site-line network switch is configured to allow the third bandwidth controller to operate for packets which are forwarded to the carrier network, and for packets which are forwarded from the carrier network, and each local-branch-site-line network switch further comprises a source-node identifying section configured to transfer to the first or second bandwidth controller, packets forwarded from the carrier network, such that, selected ones of the packets, each of which is sourced from the instant local-branch-site-line network switch or other local-branch-site-line network switches, are transferred to the first bandwidth controller, while selected ones of the packets, each of which is sourced from one of the at least one data-center-site-line network switch, are transferred to the second bandwidth controller.

3. The communication network system according to claim 2, wherein each local-branch-site-line network switch further comprises a data-center-site-line-address storage for storing a data-center-site-line address which corresponds to a device or a network connected to each of the at least one data-center-site-line network switch via one of the at least one data-center-site line, the destination-node identifying section of each local-branch-site-line network switch is configured to transfer packets to the first or second bandwidth controller, such that packets each having a destination address which does not match the data-center-site-line address, are transferred to the first bandwidth controller, while packets each having a destination address which matches the data-center-site-line address, are transferred to the second bandwidth controller, and the source-node identifying section of each local-branch-site-line network switch is configured to transfer packets to the first or second bandwidth controller, such that packets each having a source address which does not match the data-center-site-line address, are transferred to the first bandwidth controller, while packets each having a source address which matches the data-center-site-line address are transferred to the second bandwidth controller.

4. The communication network system according to claim 2, wherein each local-branch-site-line network switch further comprises a data-center-site-line-address storage storing a data-center-site-line address corresponding to a device or a network connected to each of the at least one data-center-site-line network switch via one of the at least one data-center-site line, the destination-node identifying section of each local-branch-site-line network switch is configured to transfer packets to the first or second bandwidth controller, such that packets each having a destination address which does not match the data-center-site-line address, are transferred to the first bandwidth controller, while packets each having a destination address which matches the data-center-site-line address, are transferred to the second bandwidth controller, each of the at least one data-center-site-line network switch further comprises a flag setter configured to allow the third bandwidth controller to operate for packets which is to be forwarded to the carrier network, and to set a flag for or add the flag to each of the packets, and each local-branch-site-line network switch further comprises, instead of the source-node identifying section, a flag checker configured to transfer to the first or second bandwidth controller, packets forwarded from the carrier network, such that, selected ones of the packets, each of which is not flagged, are transferred to the first bandwidth controller, while selected ones of the packets, each of which is flagged, are transferred to the second bandwidth controller, the flag checker further configured to reset the flag of or remove the flag from each packet which is to be transferred to the second bandwidth controller, before transfer to the second bandwidth controller.

5. The communication network system according to claim 3, wherein each local-branch-site-line network switch further comprises:
a forwarding database having stored therein a correspondence between a plurality of network-switch identifiers of network switches and a plurality of line addresses corresponding to a device or a network connected to the network switches via corresponding respective lines; and
a data-center-site-line-address setting section configured to operate, after and in accordance with user entry into an operator console, of a data-center-site-line-network-switch identifier which matches one of the plurality of network-switch identifiers stored in the forwarding database, to fetch from the forwarding database, one of the plurality of line addresses which corresponds to the matching network-switch identifier, and to store the fetched line address into the data-center-site-line-address storage, as the data-center-site-line address.

6. The communication network system according to claim 4, wherein each local-branch-site-line network switch further comprises a second flag-setter configured to set a second flag A for or add the second flag A to each of packets whose destination address matches the data-center-site-line address,
each of the at least one data-center-site-line network switch further comprises:
a third flag-setter configured to set a third flag B for or add the third flag B to each of packets which are to be forwarded to the carrier network; and
a flag resetter configured to reset the second and third flags A and B of or remove the second and third flags A and B from each of packets which have been forwarded from the carrier network,
each local-branch-site-line network switch further comprises:
a misbehaving-packet bandwidth limiter configured to narrow significantly or block a transmission bandwidth for packets received;
a second flag checker configured to transfer to the first bandwidth controller, the second bandwidth controller or the misbehaving-packet bandwidth limiter, packets forwarded from the carrier network, such that, selected ones of the packets, whose second or third flag A or B is not set, are transferred to the first bandwidth controller; selected ones of the packets, whose third flag B is set, are transferred to the second bandwidth controller; while selected ones of the packets, whose second flag A is set, are transferred to the misbehaving-packet bandwidth limiter; and
a second flag-resetter configured to reset the second and third flags A and B of or remove the second and third flags A and B from the packets.

7. The communication network system according to claim 2, wherein each local-branch-site-line network switch further comprises a data-center-site-line-carrier-MAC (Media Access Control)-address storage for storing a data-center-site-line-carrier-MAC address for identifying each of the at least one data-center-site-line network switch, the destination-node identifying section is configured to transfer packets to the first or second bandwidth controller, such that packets whish are to be transferred and each of which has a destination address matching the data-center-site-line-carrier-MAC address, are transferred to the second bandwidth controller, while packets which are to be transferred, and each of which has a destination address not matching the data-center-site-line-carrier-MAC address, are transferred to the first bandwidth controller, and
the source-node identifying section is configured to transfer packets to the first or second bandwidth controller, such that packets each of which has a source address matching the data-center-site-line-carrier-MAC address, are transferred to the second bandwidth controller, while packets each of which has a source address not matching the data-center-site-line-carrier-MAC address, are transferred to the first bandwidth controller.

8. The communication network system according to claim 1, wherein the packets include a first group of packets assigned the local-branch-site-line bandwidth α, and a second group of packets assigned the data-center-site-line bandwidth β,
in accordance with user entry into an operator console, the first and second groups are assigned different levels of priorities, in a variable manner, and
each of the first and second bandwidth controllers of each local-branch-site-line network switch further comprises a priority-queuing section configured to queue the first and second groups, such that one of the first and second groups which is at a higher level of priority is directed to one of a plurality of priority queues which is higher in priority than others.

9. The communication network system according to claim 1, wherein the data-center-site-line bandwidth β is equal to a physical interface bandwidth for the local-branch-site lines.

10. The communication network system according to claim 1, wherein each local-branch-site-line network switch is configured to limit a transmission bandwidth of each of all of outbound packets to the local-branch-site-line bandwidth α, the outbound packets forwarded from the instant local-branch-site-line network switch to the carrier network, and
each local-branch-site-line network switch is further configured to limit a transmission bandwidth of each of inbound packets forwarded from the carrier network to the instant local-branch-site-line network switch, such that a transmission bandwidth of each of selected ones of the inbound packets, each of which has been sourced from the instant local-branch-site-line network switch or other local-branch-site-line network switches, becomes the local-branch-site-line bandwidth α, while a transmission bandwidth of each of selected ones of the inbound packets, each of which has been sourced from one of the at least one data-center-site-line network switch, becomes the data-center-site-line bandwidth β.

11. The communication network system according to claim 1, wherein each local-branch-site-line network switch is configured to limit a transmission bandwidth of each of outbound packets forwarded from the instant local-branch-site-line network switch to the carrier network, such that a transmission bandwidth of each of selected ones of the outbound packets, each of which is destined for other local-branch-site-line network switches, becomes the local-branch-site-line bandwidth α, while a transmission bandwidth of each of selected ones of the outbound packets, each of which is destined for one of the at least one data-center-site-line network switch, becomes the data-center-site-line bandwidth β, and each local-branch-site-line network switch is further configured to limit a transmission bandwidth of each of all of inbound packets to the local-branch-site-line Bandwidth α, wherein the inbound packets are forwarded from the carrier network to the instant local-branch-site-line network switch.

12. The communication network system according to claim 1, wherein the carrier network has first and second sub-networks, and the communication network system is configured such that the plurality of local-branch-site-line network switches are interconnected via the first sub-network, and such that the plurality of local-branch-site-line network switches and the at least one data-center-site-line network switch are interconnected via the second sub-network.

13. A network switch connected with a carrier network, comprising:

a local-branch-site-line-interface-function element configured to implement the same function as each of the plurality of local-branch-site-line network, switches included in the communication network system defined in claim 1, and a data-center-site-line-interface-function element configured to implement the same function as each of the at least one data-center-site-line network switch included in the communication network system defined in claim 1.

14. The network-switch according to claim 13, further comprising a looping-back section configured to operate, when an inbound packet which is to be forwarded to the carrier network has a destination address matching a line address of the local-branch-site-line-interface-function element or the data-center-site-line-interface-function element within the instant network-switch, such that the inbound packet is looped back to a corresponding one of the local-branch-site-line-interface-function element and the data-center-site-line-interface-function element, so as to acting as an outbound packet which has been forwarded from the carrier network.

15. A bandwidth control method processor-implemented in a communication network system in which a plurality of local-branch-site-line network switches accommodating a plurality of local-branch-site lines, respectively, and at least one data-center-site-line network switch accommodating a data-center-site line, are interconnected via a carrier network, the method comprising:

operating, by a computer processor, each local-branch-site-line network switch to limit a communication bandwidth, such that a bandwidth for communications between the instant local-branch-site-line network switch and other local-branch-site-line network switches, becomes a pre-selected local-branch-site-line bandwidth α, while a bandwidth for communications between the instant local-branch-site-line network switch and each of the at least one data-center-site-line network switch, becomes to a pre-selected data-center-site-line bandwidth β broader than the local-branch-site-line bandwidth α; and operating each of the at least one data-center-site-line network switch to limit a bandwidth for communications between the instant data-center-site-line network switch and the plurality of local-branch-site-line network switches, to a pre-selected data-center-site-line bandwidth γ.

* * * * *